United States Patent [19]

Hagen

[11] Patent Number: 4,943,659

[45] Date of Patent: Jul. 24, 1990

[54] PROCESS FOR PREPARATION OF ALPHA, BETA-UNSATURATED ACIDS

[75] Inventor: Gary P. Hagen, Glen Ellyn, Ill.

[73] Assignee: Amoco Corporation, Chicago, Ill.

[21] Appl. No.: 946,986

[22] Filed: Dec. 29, 1986

Related U.S. Application Data

[63] Continuation of Ser. No. 785,326, Oct. 7, 1985, abandoned, which is a continuation of Ser. No. 632,018, Jul. 18, 1984, abandoned, which is a continuation of Ser. No. 412,914, Aug. 30, 1982, abandoned.

[51] Int. Cl.$^5$ .................... C07C 51/353; C07C 57/04; C07C 57/26; C07C 57/42
[52] U.S. Cl. ................................. 562/599; 260/405.5; 562/405; 562/495; 562/503; 562/504; 562/510
[58] Field of Search .............. 562/599, 598, 504, 400, 562/495, 503, 405, 510; 260/405.5

[56] References Cited

U.S. PATENT DOCUMENTS 3,840,587 10/1974 Pearson ............................... 562/598

Primary Examiner—Vivian Garner
Attorney, Agent, or Firm—Reed F. Riley; William M. Magidson; Ralph C. Medhurst

[57] ABSTRACT

Catalyst and process are disclosed for preparation of alpha, beta-unsaturated acids. Catalyst comprises a silica component and a Group IA alkali metal component which is present in an amount of from 200 to 15,000 parts per million, said silica component containing less than about 500 parts per million individually of aluminum, zirconium, titanium, iron and mixtures thereof. Process comprises reacting formaldehyde and a carboxylic acid of the formula $RHC_2COOH$ wherein R is a member of the class consisting of —H, -alkyl, -aryl, -aralkyl, -cycloalkyl, and -alkylaryl radicals in the presence of said catalyst. Catalyst activity is maintained during process by addition of source of alkali metal component.

18 Claims, No Drawings

PROCESS FOR PREPARATION OF ALPHA, BETA-UNSATURATED ACIDS

This is a continuation of application Ser. No. 785,326, filed Oct. 7, 1985, now abandoned, which in turn is a continuation of application Ser. No. 632,018 filed July 18, 1984, now abandoned, which in turn is a continuation of application Ser. No. 412,914 filed Aug. 30, 1982, now abandoned.

BACKGROUND OF THE INVENTION

Preparation of alpha-methacrylic acid by reacting propionic acid and formaldehyde over a suitable catalyst is well-known. This invention is directed to a process for synthesis of alpha, beta-unsaturated acids by reaction between formaldehyde and a carboxylic acid of the formula $RCH_2COOH$ wherein R is a member of the class consisting of —H, —alkyl, —aryl, —aralkyl, —cycloalkyl, and —alkylaryl radicals. When R is not hydrogen, the number of carbons in R is preferably from 1 to 18.

This invention is directed to a process for synthesis of alpha, beta-unsaturated acids, e.g., alpha-methacrylic acid from propionic acid and formaldehyde. The process requires the presence of a catalyst prepared by an acid catalyzed precipitation of silica containing very low levels, in trace amounts, of metals of Groups IIIA, IVB and VIII of the Periodic Table of Elements found in the 46th edition of the *Handbook of Chemistry and Physics* published by the Chemical Rubber Company, including aluminum, titanium, zirconium, and iron, up to about 500 parts per million (ppm) individually, and into which are incorporated basic metal components of Group IA, e.g., sodium. This invention is also directed to a process for maintaining activity and selectivity of the invented catalyst wherein a sufficiently soluble source of alkali metal ions is added during the process whereby the required level of basic metal components of Group IA is maintained upon the catalyst.

Unsaturated acids, such as methacrylic and acrylic acids, acrylonitrile and the esters of such acids, such as methyl alpha-methacrylate, are widely used for the production of corresponding polymers, resins and the like. Various processes and catalysts have been proposed for the conversion of alkanoic acids, such as propionic acid, and formaldehyde to the corresponding unsaturated monocarboxylic acids, e.g., methacrylic acid, by an aldol-type reaction. Generally, the reaction of the acid and formaldehyde takes place in the vapor or gas phase while in the presence of a basic or acidic catalyst.

Various catalysts have been proposed for such reaction. For example, Vitcha, et al., *I&EC Product Research and Development*, 5, No. 1 (March, 1966) pp. 50–53, propose a vapor phase reaction of acetic acid and formaldehyde employing catalysts comprising alkali and alkaline earth metal aluminosilicates, silica gel, alumina and the like. U.S. Pat. No. 2,821,543 teaches use of a catalyst comprising a basic metal compound such as a basic salt or oxide upon activated silica. The example taught is 10 wt. % of manganese oxide on activated silica. U.S. Pat. No. 3,051,747 describes the preparation of acrylic acids by reacting an alkanoic acid and formaldehyde in the presence of a catalyst comprising an alkali metal salt of the alkanoic acid supported on alumina. The same reaction is also promoted by catalysts which include alkali metal or alkaline earth metal aluminosilicates, silica gel or alumina. Catalysts of this kind are described in U.S. Pat. No. 3,247,248 which teaches a process for the reaction of formaldehyde and acetic acid or propionic acid in the presence of a natural or synthetic aluminosilicate catalyst that may include alkali or alkaline earth metals, such as the aluminosilicates of sodium, potassium, rubidium, magnesium, calcium, strontium or barium. In addition, the use of silica gel in combination with an alkali metal or alkaline earth metal hydroxide as a catalyst for the reaction is described. U.S. Pat. Nos. 3,840,587 and 3,840,588 teach preparation of alpha, beta-ethylenically unsaturated compounds by vapor phase reaction of formaldehyde and saturated carboxylic acids in the presence of a Group IA metal compound associated with a silica gel support, the content of the Group IA compound calculated as the hydroxide in the range of 0.01 to 10 weight percent of the completed catalyst. U.S. Pat. No. 3,933,888 teaches the preparation of unsaturated acids, and the preparation of esters and nitriles of such unsaturated acids wherein alkanoic acids, esters of such acids and alkyl nitriles are reacted with formaldehyde in the presence of a basic catalyst comprising pyrogenic silica. Pyrogenic silica is taught as displaying radically different properties from silica gel. The pyrogenic silica is taught as especially effective when treated with activating agents which provide basic sites on the pyrogenic silica catalyst support, such as organic bases, inorganic bases of Groups IA, IIA and IIIB of the Periodic Table, particularly the alkaline metal hydroxides such as potassium hydroxide and cesium hydroxide. The addition of a compound of a metal as an activating agent is taught as increasing the effectiveness of the catalyst.

Other processes and catalysts have been proposed for the preparation of methacrylic acid, esters and nitriles. U.S. Pat. No. 3,089,898 teaches a process and catalyst for preparation of methyl acrylate which comprises contacting vapor mixtures of methyl acetate and formaldehyde with aluminosilicate catalysts, particularly alkaline earth metal zeolites, alkali metal zeolites and zeolites of certain heavy metals such as manganese, cobalt, zinc, cadmium and lead. Aqueous and alcoholic sources of formaldehyde are taught as useful. U.S. Pat. No. 3,089,899 teaches preparation of methyl methacrylate which comprises contacting vapor mixtures of methyl propionate and formaldehyde with zeolite catalysts, particularly certain synthetic zeolites, especially the aluminosilicates of Group IIA of the Periodic Table, such as magnesium, calcium, strontium and barium aluminosilicates, and manganous aluminosilicates. Aqueous or alcoholic formaldehyde or anhydrous paraformaldehyde can be used. U.S. Pat. No. 3,535,371 teaches a process and catalyst for preparing acrylic esters by contacting a gaseous mixture of formaldehyde, an aliphatic carboxylic acid such as acetic, propionic, butyric, valeric, caproic and the like, and an aliphatic alcohol such as methanol, ethanol, propanol, butanol, pentanol, hexanol and the like, in the presence of a niobium oxide catalyst upon a catalyst support of silicon carbide, silica or alumina, but preferably alumina. Formaldehyde used can be of any suitable form, either anhydrous or aqueous. U.S. Pat. No. 4,118,588 teaches a process and catalyst for preparing methacrylic acid and methyl methacrylate which comprises reacting, respectively, propionic acid and methyl propionate with dimethoxymethane in the presence of catalysts based on phosphates and/or silicates of magnesium, calcium, aluminum, zirconium, thorium and/or titanium and in the presence of water. Boric acid and/or urea can also be present. Preferably, the catalysts are modified with alkali metal and/or alkaline earth metal carboxylates and/or alkali metal compounds and/or alkaline earth metal compounds which yield carboxylates under the reaction conditions. Suitable modifiers are the carboxylates, oxides and hydroxides of lithium, sodium, potassium, magnesium and calcium as well as those of beryllium, strontium, rubidium, cesium and barium.

However, the processes and catalysts taught heretofore suffer from disadvantages which are greatly minimized in the process of the present invention. The processes as described in Vitcha, *I&EC, op. cit.* p. 50, are inferior to the present invented process in that conversion of formaldehyde is low when reactant acid concentration is low. Hence, large excesses of acid reactant are used and, thus, acid conversion is necessarily low. Vitcha indicates that as the ratio of reactant acid to formaldehyde decreases, the competitive reaction of formaldehyde with itself to form polymers predominates, to result in lower conversion and yield. U.S. Pat. No. 3,051,747 indicates that yields are low (5 to 11%) and the major product of the process is not an unsaturated compound but a symmetric ketone. Processes described in U.S. Pat. Nos. 3,247,248 and 3,933,888 are also inferior to the process of the present invention. Yield percent based on formaldehyde taught by U.S. Pat. No. 3,247,248 with 5:1 ratios of acid to formaldehyde is between 29 and 40 percent. U.S. Pat. No. 3,933,888 teaches the major products are methacrylic acid and its ester, methyl methacrylate, not methacrylic acid predominantly.

In addition to the above disadvantages, the references fail to appreciate the level of alkali content of the catalyst as being significant. The references also fail to appreciate that there is an apparent loss of alkali content as the reaction continues.

An object of the present invention is to provide a catalyst and process for making alpha, beta-unsaturated acids from formaldehyde and other carboxylic acids. A further object is to provide a catalyst and process for making alpha, beta-unsaturated acids from formaldehyde and other carboxylic acids wherein catalyst activity is maintained. A further object is to provide a catalyst and process for making alpha-methacrylic acid. Another object is to provide a catalyst and process for acrylic acid. Other objects will appear hereinafter.

Quite unexpectedly it has been found modified or unmodified silica gel catalysts prepared from precipitated colloidal silica perform in a much superior manner for the present process with respect to conversion and selectivity relative to conventional catalysts, based on silica gel and the like. The improved catalyst formulation has several unexpected results. Whereas conventional catalyst formulations result in low formaldehyde-based yields of methacrylic acid when the ratio of propionic acid to formaldehyde is low, such as 1:1, high yields of alpha-methacrylic acid can be obtained in the process of the instant invention when the ratio of propionic acid to formaldehyde is as low as about 0.1:1. Preferred reactant acid:formaldehyde ratio for the process of the present invention is 1:1 to 5:1, preferably 1:1 or 2:1, with consequent economic advantage. The present invention is preferably with the use of a dry formaldehyde such as gaseous monomer, methanolic formaldehyde, trioxane or paraformaldehyde; and the catalyst preferably contains very low levels of the active basic components of Group IA such as sodium, or other basic components of other groups of the Periodic Table.

Quite unexpectedly it has been found that the process of the instant invention wherein an alkali component is added continuously or discontinuously to the feed materials prolongs catalyst activity and aids in maintaining product yields.

SUMMARY OF THE INVENTION

A catalyst and process are disclosed for preparation of alpha, beta-unsaturated acids by reaction of formaldehyde and carboxylic acid of the formula $RCH_2COOH$ wherein R is a member of the class consisting of —H, —alkyl, —aryl, —aralkyl, —cycloalkyl, and —alkylaryl radicals in the presence of a catalyst of precipitated colloidal silica wherein an alkali metal component is continually present and the colloidal silica component contains up to 500 parts per million by weight individually of aluminum, zirconium, titanium and iron, under reaction conditions wherein the reactant acid:formaldehyde ratio is from about 0.1:1 to 20:1 at a temperature within the range of from about 250° C. to about 430° C. The presence of the alkali metal component is maintained by adding a quantity of the alkali metal component as a soluble compound during the process.

DETAILS OF THE INVENTION

The process of the instant invention relates to the preparation of alpha, beta-unsaturated acids by reaction of formaldehyde and a carboxylic acid of the formula $RCH_2COOH$ wherein R is a member of the class consisting of —H, —alkyl, —aryl, —aralkyl, —cycloalkyl, and —alkylaryl radicals, the number of carbon atoms in R being preferably from 1 to 18, in the presence of a silica gel catalyst prepared from a colloidal suspension of silica particles wherein the alkali metals content is maintained in the range of from about 200 ppm to about 15,000 ppm, as sodium and, alternatively, in mole equivalents, as other Group IA alkali metals of the Periodic Table of Elements found in the 46th edition of the *Handbook of Chemistry and Physics* published by the Chemical Rubber Company.

The alpha carbon of the reactant acid of the formula $RCH_2COOH$ is required to possess at least two hydrogen atoms. When R is not hydrogen, suitable carboxylic acids preferably contain from 1 to 18 carbon atoms in addition to the —$CH_2COOH$ moiety. Examples are acetic acid, propionic acid, n-butyric acid, n-valeric acid, isovaleric acid, n-caproic acid, n-heptanoic acid, capric and lauric acids, phenylacetic acid, gamma-phenylbutyric acid, and 3-methylcyclopentylacetic acid.

The process of the instant invention also relates to a synthesis of alpha-methacrylic acid from propionic acid and formaldehyde in the presence of the invented silica gel catalyst. Yield of alpha-methacrylic acid is increased over previously taught processes and production of by-products is minimized. The general method requires use of a precipitated highly pure silica gel catalyst prepared by precipitating a colloidal silica under controlled conditions in the presence of hydrogen ions to obtain a firm silica gel. Naturally occurring content of trace metals, i.e., aluminum, zirconium, titanium and iron, in highly pure water glass used to make silica gel, is preferably under 500 parts per million (ppm) by weight of each trace metal. The gel is thereupon dried, crushed, optionally washed and redried, followed by calcining at a suitable temperature to obtain a silica gel catalyst containing from about zero to about 500 ppm, individually, of aluminum, zirconium, titanium or iron, about 200 to 15,000 ppm of an alkali metal, measured as sodium and as sodium mole equivalents, preferably from about 1000 to about 3000 ppm of sodium in the form of a hydroxide, or of sodium mole equivalents, and having a surface area of from about 50 to about 500 m$^2$/g, pore volume of from about 0.5 to 3.5 cc/g, average pore diameter of from about 80 to 600 Å. A preferable range for tribasic alkali metal salts such as sodium phosphate, Na$_3$PO$_4$, is 1000 to 9000 parts per million of sodium. A narrow distribution of large pores, larger than 100 Å, is preferred. A narrow distribution of pore size is obtained when the colloid is gelled preferably at a pH of from about 5.0 to about 6.0, preferably of about 5.5. A lower pH of 2 to 3 or a higher pH of 7 to 8 results in a broader distribution. The washing of the gel is optional, depending upon whether the basic salts of metals of Group IA are desirably incorporated into the catalyst during the gellation process or are later impregnated into the catalyst whereupon preliminary washing is required to reduce the level of the Group IA metals to less than 200 ppm.

It has been found that catalysts prepared by the above method are effective in catalyzing the reaction of carboxylic acids of the formula RCH$_2$COOH and formaldehyde under anhydrous conditions wherein the acid:formaldehyde ratio is from about 0.1:1 to about 20:1 at a temperature within the range of from about 250° C. to about 430° C. Dry formaldehyde monomer in gaseous form, paraformaldehyde, methanolic formaldehyde or trioxane can be used as a formaldehyde source.

It is essential for the process and catalyst of the instant invention that water in the reactant acid-formaldehyde feed and in the reactor under operating conditions be maintained at a level of no more than 20% of total weight of the acid-formaldehyde reactant in anhydrous form, preferably no greater than a maximum of 8% by weight added to the combined weight of the anhydrous acid-formaldehyde-water feed, more preferably no greater than 4% by weight. Since water is produced as a by-product of the instant reaction, the reaction can be self-deactivating to the extent that higher conversions of the reactant acid-formaldehyde feed cause higher gas phase concentrations of water in the catalyst bed, thus requiring an increased operating temperature or increased catalyst alkali levels, which, in turn, decreases selectivity to the alpha, beta-unsaturated acids.

It is essential that catalyst content of alkali metal ion, as mentioned already, be within the range of from about 200 to 15,000 ppm, measured as sodium or as sodium mole equivalents, as catalyst activity and selectivity in the synthesis of alpha, beta-unsaturated acid are closely linked to the level of alkali metal present in the catalyst. For example, if the level of sodium is too low, below 200 ppm, product yields and selectivities are low because of low conversions and decomposition of formaldehyde to gaseous products and/or coke products. If too high, above 15,000 ppm of sodium in the catalyst, propionic acid and formaldehyde selectivities to methacrylic acid become low.

Measurement of alkali metal content as sodium mole equivalents is defined as measurement of alkali metal content present in moles of Group IA metals equivalent to moles of sodium measured in parts per million.

Alkali metals other than sodium can be used in preparation of the instant invented catalyst. Lithium, potassium, rubidium, and cesium, as well as sodium, are suitable. Both potassium- and cesium-loaded silica catalysts exhibit significantly higher catalytic activities than the lithium- and sodium-silica catalysts but with less selectivity to methacrylic acid at the temperatures preferred for the sodium- and lithium-containing catalysts. The higher activity and lower selectivity can be compensated for by using lower loading levels of potassium and cesium on the silica catalysts.

The alkali metal can be incorporated into the silica substrate by using any suitable source of alkali metal ion. Hydroxides of sodium, potassium, lithium, rubidium, and cesium can be used as well as phosphates, silicates, carbonates and other alkali metal salts, including halides, cyanates, borates, aluminates, nitrates, sulfates, sulfides, titanates, tungstates, vanadates, stannates, alkanoates and any inorganic and organic base that can be incorporated into or on the catalyst under the required reaction conditions.

Experience has shown that as the process proceeds there is loss of alkali metal from the process catalyst with concurrent loss of catalyst activity. Accordingly, it is an essential element of the instant invention to add a source of alkali metal ions to the reaction process to maintain catalyst activity and selectivity. Any suitable method of addition can be used including direct addition to the feedstock, liquid phase impregnation in the reactor, and sublimation. Any suitable source of alkali metal ion can be used. Hydroxides of sodium, potassium, lithium, rubidium, and cesium can be used as well as phosphates, silicates, carbonates and other alkali metal salts, including halides, cyanates, borates, aluminates, nitrates, sulfates, sulfides, titanates, tungstates, vanadates, stannates, alkanoates and any inorganic and organic base that is sufficiently soluble or sublimable in the reaction mixture to provide a source of alkali metal ions. Since loss of alkali metal ion will depend upon a variety of reaction conditions including propionic acid-formaldehyde ratio, LHSV, and reaction temperature, rate of addition of added alkali metal ions will vary but the rate of addition is such that the level of alkali metal ions on the catalyst is maintained within the level of from about 200 to 15,000 ppm, preferably from about 1000 to about 9000 ppm as sodium, or as Group IA metals in sodium mole equivalents measured in parts per million. Addition of alkali metal ion can be made continuously or discontinuously, continuously at a predetermined rate or, discontinuously, as the level of sodium ion replenishment is required, as determined by suitable analysis or test results.

The novel process of the present invention is useful to synthesize alpha-methacrylic acid from propionic acid and formaldehyde. The instant invented process is useful in synthesis of acrylic acid by the vapor phase reaction of acetic acid and formaldehyde. The instant invented process is useful in synthesizing other unsaturated monocarboxylic acids.

The amorphous silica colloid from which the precipitated silica catalyst is prepared can be prepared using any commercially available sodium silicate or as taught in U.S. Pat. Nos. 2,244,325; 2,574,902; 2,577,484; 2,577,485; 2,750,345; 3,012,973 and 3,440,176 which are incorporated herein by reference. Preparations of colloidal silica available from commercial sources can also be used, such as Nalcoag (Trademark), a product of Nalco Chemical Company, Chicago, Illinois, and Ludox (Trademark) colloidal silica, a product of E. I. du Pont de Nemours & Co. (Inc.), Industrial Chemicals Dept., Wilmington, Delaware. Commercially available silica colloids provide catalysts which are quite selective (especially at low reaction temperatures and/or contact times) in spite of the existence of trace metal impurities (aluminum, zirconium, titanium, iron, etc.) normally present in such colloids. However, it has been found that acid extraction of these impurities from the silica gels to lower levels (below 100 ppm in the case of some impurities as sodium) and subsequent impregnation with an active alkali metal salt improves selectivity to methacrylic acid significantly.

Accordingly, it has been found that a more reactive catalyst containing the lowest possible levels of aluminum, zirconium, titanium and iron is obtained by the method of the instant invention which results in substantially increased product yields and minimum production of by-products in the invented process.

The instant invented process is a single step process for synthesis of alpha-methacrylic acid which is catalyzed effectively by the silica gel catalyst obtained from colloidal silica by the method of preparation of the instant invention.

The invented process involves the condensation of formaldehyde, conveniently as trioxane, with propionic acid. Although the mechanism is unknown, propionic acid is known to form surface species on silica gel (probably surface silyl esters of propionic acid) which may be intermediates in this reaction.

Formaldehyde can be used in any suitable dry form such as dry formaldehyde monomer in a gaseous state, paraformaldehyde, methanolic formaldehyde and trioxane.

The reaction occurs at atmospheric pressure in the gas phase when the reactants are passed through the catalyst in the presence of a nitrogen carrier gas at a temperature of about 250° C. to about 430° C. Above 400° C. significant amounts of various by-products are formed. Reactant pressures of from about 0.5 to 10 atmospheres can be used. A broad range of reactant ratios may be successfully used for this process of from 0.1:1 to 20:1, preferably in ratios of 1:1 to 5:1, acid:formaldehyde. For example, when propionic acid and formaldehyde, (as trioxane), in mole ratios varying from 5:1 to 1:1, propionic acid:available formaldehyde, are allowed to react at a temperature of 385° C. (or 390° C.), yields of methacrylic acid obtained vary, respectively, from 6–31% based on propionic acid. In these examples the percent of total propionate observed in the product mixture, either as unreacted propionic acid, methacrylic acid, or 3-pentanone (the major by-product) varies from 90–100%, depending on the reactant ratios and reaction conditions. Highest levels of 3-pentanone occur in the product mixture when the reaction is carried out at higher temperatures (>400° C.) and/or with feed containing high levels of propionic acid, e.g., 5:1 mole ratio of propionic acid to formaldehyde, and/or with too high catalyst alkali levels. Useful temperatures for this process may be as high as 425° C., at which point uncatalyzed degradation reactions of propionic acid are known to occur. At temperatures below 250° C., yields of methacrylic acid are low.

Yields as high as 76%, based on propionic acid, have been obtained with mole ratios of 0.143:1 in the presence of a diluent such as toluene. Other aromatics include benzene and xylenes.

Liquid hourly space velocity (LHSV) measured in terms of volume of liquid per volume of catalyst per hour ($V_1 C_c^{-1} hr^{-1}$), is from about 0.05 to 20.0, preferably from about 0.1 to about 10.0. A LHSV less than about 0.05 results in nonselective decomposition of reactants. A LHSV above 20 results in low conversion of reactants.

Yield calculations can be based upon either propionic acid or formaldehyde. For example, propionic acid-based yields are calculated as follows:

$$\frac{\text{Moles of Methacrylic Acid Product}}{\text{Moles Propionic Acid in Feed}} \times 100 = \text{Yield}$$

Formaldehyde-based yields are calculated as follows:

$$\frac{\text{Moles of Methacrylic Acid Product}}{\text{Moles Formaldehyde in Feed}} \times 100 = \text{Yield}$$

Propionic acid selectivity is calculated as follows:

$$\frac{\text{Moles of Methacrylic Acid Product}}{\text{Moles Propionic Acid Reacted}} \times 100 =$$

Propionic Acid Selectivity

Formaldehyde selectivity is calculated similarly.

The invention will be illustrated by reference to the following specific examples. It should be understood, however, that the detailed expositions of the process and catalyst of the invention, while indicating preferred embodiments, are given by way of illustration only since various changes and modifications within the spirit and scope of the invention will become apparent to those skilled in the art and are not intended to limit the scope of the invention.

Analysis of catalysts was by atomic absorption (A. A.) spectroscopy and by Edax spectroscopy (energy dispersive analysis of X-ray fluorescence for qualitative and semi-quantitative analysis). Limit of resolution of analysis by Edax is about 100 parts per million. In the following Examples, Edax analysis results can be indeterminate wherein element content is 100 parts per million or less.

EXAMPLE I

An amorphous silica-alumina colloid containing added contaminant aluminum was prepared in the following manner. A sodium form of a low-level aluminosilicate was formed to obtain a catalyst of lower selectivity.

A quantity (286.0 gms) of commercial sodium silicate solution (40–42 Bē, 28.4% $SiO_2$, technical grade) was diluted to 2.000 kg. To this was added 0.164 gms of $NaAlO_2 \cdot 1\frac{1}{4} H_2O$ dissolved in 10 ml of distilled water. Of this solution, 72 gms were reserved and the remainder was passed in four batches through a strong acid ion-exchange column (4 ft. column, 1.5 inches in diameter, filled halfway with 500 ml of Amberlite 120H) at a rate of 25 ml/min.

The effluent was almost clear (very slightly cloudy) and the pH of the four batches was 3.4–3.6. The reserved 72 gms of dilute sodium silicate were added to the combined batches of polysilicic acid and the resulting pH was 7.5. (This procedure is carried out in order to stabilize the polysilicic acid against gelling, especially heat induced.) The entire solution was added to a 1 gallon autoclave and heated for six hours at a temperature of 185° C. for the purpose of growing polysilicic acid into large colloidal particles, 100–200 Å. The solution was allowed to cool to room temperature and was then concentrated to 17% silica content by vacuum evaporation at 30° C. to prepare an amorphous alumina-silica colloid.

A 140 g sample of silica colloid as prepared above was added to a beaker, and with stirring, the pH was lowered from about 10.5 to 3.0 by the dropwise addition of concentrated nitric acid. The pH was then raised to 6.0 by the dropwise addition of concentrated ammonium hydroxide. The mixture was allowed to stir at about 50° C. for six hours, after which a thick gel was formed. The gel was dried for two hours in a drying oven at a temperature of 130° C., crushed and sieved to 18/40 mesh granules, and was then washed five times with distilled water at 95° C. in order to remove excess sodium. The catalyst was then redried and calcined for 16 hours at a temperature of 525° C. to prepare 22 grams of Catalyst A, a sodium form of an amorphous silica-alumina gel. This material was analyzed by A. A. spectroscopy and by Edax spectroscopy to contain 600 ppm of aluminum, 700 ppm of sodium, <100 ppm of zirconium, <100 ppm of titanium and <200 ppm of iron. BET surface area was 112 m$^2$/gm, pore volume: 0.5373 cc/gm, average pore diameter: 154 Å.

EXAMPLE II

The sodium form of Catalyst A was converted to the hydrogen form, Catalyst B, which demonstrated a further decrease in selectivity to methacrylic acid when used as a catalyst.

A 4.75 gm sample of the preparation of Catalyst A was added to a flask containing 7.6 ml of 4N ammonium acetate. The contents were heated to 50° C., removed from the heat and allowed to cool for two hours to about room temperature. The solution was removed by decantation and the catalyst was washed three times with distilled water at room temperature. This exchange and wash procedure was repeated two more times, after which the catalyst was dried for 16 hours at a temperature of 120° C. and then calcined for 16 hours at a temperature of 525° C. to prepare Catalyst B, a hydrogen form of an amorphous silica-alumina colloid. This material was reported to contain 600 ppm of Al and 300 ppm of Na by A. A. spectroscopy. Other analyses were: <100 ppm zirconium, <100 ppm titanium, <100 ppm iron, by Edax spectroscopy.

EXAMPLE III

An amorphous silica colloid was prepared in the procedure of Example I except that sodium aluminate was excluded from the preparation. The resulting colloidal silica catalyst, Catalyst C, was reported to contain 360 ppm Al, and 1630 ppm Na by A. A. spectroscopy. Other analyses were: <100 ppm zirconium, <100 ppm titanium, <200 ppm iron by Edax spectroscopy. The resulting catalyst, Catalyst C, demonstrated higher selectivity with only naturally occurring aluminum in the commercial sodium silicate.

EXAMPLE IV

Example III was repeated with a commercial colloidal silica.

A 200 ml sample of commercial colloidal silica, Ludox (Trademark) AS-40 Brand, E. I. du Pont de Nemours & Co. (Inc.), Industrial Chemicals Dept., Wilmington, Delaware, was placed in a beaker. Temperature was 25° C. The material was an aqueous colloidal dispersion of silica particles having a high specific surface area. Characteristics were as follows: specific surface area, m$^2$/g 130; av. particle diameter, mm. 21; silica (as SiO$_2$) 40 wt %; pH (25° C.) 8.0. With stirring, the pH of the sample was lowered from about 10.5 to 3.0 by dropwise addition of concentrated nitric acid (0.16N). The pH was then raised to about 6.0 by the dropwise addition of concentrated ammonium hydroxide (0.15N). The mixture was thereupon stirred for 8 hours, at a temperature of 25° C., at which time a thick gel had formed. The gel was dried for 2 hours in a drying oven at a temperature of 120° C., then crushed and sieved to 18/40 mesh granules (U.S. sieve). The resulting catalyst, Catalyst D, was then calcined for 16 hours at a temperature of 525° C. Analysis by A. A. spectroscopy was: 400 ppm aluminum, 2100 ppm sodium, and <100 ppm zirconium, <100 ppm titanium, <200 ppm iron by Edax spectroscopy.

EXAMPLE V

A 100 gm sample of uncalcined but dried catalyst was prepared according to the procedure of Example IV. The sample was placed in a flask and covered with 0.1N aqueous HNO$_3$ to a level ¼ inch over the top of the gel layer. The mixture was heated to a temperature of 50° C. and held at that temperature for about 15 minutes. The solution was decanted off the granules. The procedure was repeated two more times with 0.16N aqueous HNO$_3$. The procedure was then repeated three times using distilled water to remove residual HNO$_3$. The solid was then dried according to the procedure of Example IV. The resulting material was then analyzed by A. A. spectroscopy and reported to contain 260 ppm sodium and 87 ppm aluminum. No iron, zirconium or titanium was detected by Edax spectroscopy. This demonstrates the practicality of significantly lowering the levels of aluminum, zirconium and iron. This material is a useful support for impregnation of catalytically-active basic materials.

EXAMPLE VI

The four catalysts of Examples I–IV, Catalysts A, B, C and D were screened for the alpha-methacrylic acid synthesis using a quartz reactor positioned in a electric tube furnace. The quartz reactor consisted of a quartz tube fitted with a thermocouple through the center of the tube to measure and control temperature. Inlets were provided at the top of the reactor for the carrier gas stream and feed materials of propionic acid and formaldehyde (as trioxane). The catalyst bed was positioned in the reactor by an inert support material. Product was removed at the bottom of the quartz tube. Reaction conditions and results are given in Table I.

Catalyst A, the sodium form, and Catalyst B, the hydrogen form, of silica-alumina colloid exhibited differences in performance. The sodium form provided significantly better propionic acid and formaldehyde selectivity than the hydrogen form, and the latter caused extensive decomposition of feed to gaseous by-products and underwent rapid deactivation. Neither Catalyst A nor Catalyst B, tested for the alpha-methacrylic acid synthesis at several reaction temperatures, provided results which were as good as those obtained with the preferred catalyst, Catalyst D. Selectivity improved with increasing level of alkali content to over 2000 ppm, as sodium, and increased purity of silica, i.e., lower levels of aluminum, zirconium, titanium and iron. Levels of zirconium, titanium and iron in Catalysts A-D in Examples I-IV, as previously indicated, were equal to or less than 200 parts per million.

TABLE I

Catalyst Analyses and Synthesis Results

| Catalyst | Catalyst Analysis Metal | ppm | Reaction Temp. °C. | Selectivity (Based on Acid) | Yield (Based on Propionic Acid) |
|---|---|---|---|---|---|
| A[1] | Na | 700 | 390 | 70.9[2] | 13.3 |
|  | Al | 600 | 390 | 81.6 | 13.7 |
|  |  |  | 400 | 73.2 | 15.3 |
|  |  |  | 425 | 73.4 | 17.9 |
| B[1] | Na | 300 | 390 | 54.1[2] | 13.1 |
|  | Al | 600 | 390 | 67.6 | 10.8 |
|  |  |  | 380 | 63.9 | 9.0 |
|  |  |  | 370 | 61.3 | 7.4 |
| C[1] | Na | 1630 | 390 | 72.6[2] | 17.8 |
|  | Al | 360 | 390 | 87.4 | 18.7 |
|  |  |  | 380 | 79.4 | 14.5 |
|  |  |  | 370 | 89.7 | 11.2 |
| D[3] | Na | 2100 | 390 | 86.4 | 19.7 |
|  | Al | 400 |  |  |  |

Notes:
Reaction Conditions: Contact Time = 3.2 sec., N₂ Carrier = 6 ml/min., LHSV = 1 (vol-based), Catalyst Vol. = 4.7 cc's, each standard run is of 135.0 minutes duration.
[1]Results presented for 4 consecutive runs.
[2]Typically low on 1st run for most catalysts.
[3]Results of 3rd run.

EXAMPLES VII–XI

Solutions containing a 2:1 mole ratio of propionic acid (PA) to formaldehyde (as trioxane) were prepared and metered into a gas phase reactor as described in Example VI containing 20.99 gms of catalyst (except where noted, vida infra) prepared as described in Example I. Results of Catalysts D and E are outlined in Table II. As is evident from Table II, selectivities based on propionic acid (PA) and formaldehyde improved with shorter contact times while the yield of methacrylic acid based on propionic acid decreased only slightly. Decreased selectivities are attributed to decomposition of reactants and/or product, alpha-methacrylic acid, to coke or gaseous by-products. Even at long contact times the use of a commercially available catalyst, Catalyst E, provided only slightly more than one-half as much yield as the invented Catalyst D at much lower selectivity. Catalyst E is a product of Davison Chemical Div., W. R. Grace & Co., Baltimore, Md. Catalyst E is a silica granule material, Type ID, Grade 57, of 99.5% silica as $SiO_2$; surface area of 300 m²/g, an alkali content of 742 ppm, as sodium, and an aluminum content of 290 ppm.

TABLE II

Comparative Results
Effect of Contact Time On Yield of Alpha-Methacrylic Acid

|  | Example VII | VIII | IX | X | XI |
|---|---|---|---|---|---|
| Run No. 5825- | 190[1] | 185[1] | 192[1] | 200[1] | 151[2] |
| Catalyst | D | D | D | D | E |
| % Selectivity on: |  |  |  |  |  |
| Propionic Acid | 80.1 | 85 | 88.3 | 96.3 | 50.4 |
| Formaldehyde | 83.3 | 82 | 87.5 | 93.2 | 39.5 |
| % Yield on: |  |  |  |  |  |
| Propionic Acid | 19.7 | 20 | 17.8 | 16.0 | 11.4 |
| Formaldehyde | 38.6 | 39 | 35.0 | 32.1 | 23.3 |
| % Mass Balance (as liquid) | 97.5 | 98.3 | 98.6 | 101.0 | 91.8 |
| Contact Time (sec.) | 2.81 | 2.41 | 1.82 | 1.53 | 3.30 |
| LHSV (hr⁻¹) | 1.12 | 1.36 | 1.87 | 2.28 | 1.00 |

[vol. based]

Notes:
[1]Reaction was carried out at a reaction temperature of 385° C. and at a carrier gas flow rate of 60 ml N₂/minute. In a typical run 200–300 ml of feed containing PA and trioxane are passed through the reactor. Catalyst weight = 20.99 gm. Catalyst volume = 37.0 ml.
[2]Reaction was carried out in a reactor under similar conditions as [1] except with smaller quantities and flow rates. Catalyst weight = 1.82 gms. Catalyst volume = 4.65 ml. Carrier gas rate = 6.0 ml/min.

EXAMPLE XII

In the procedure of Examples VI to XI, syntheses of alpha-methacrylic acid propionic acid and formaldehyde (as trioxane) were made with Catalyst D, but using mole ratios of acid and formaldehyde of 1:1, 2:1, 3:1, 4:1 and 5:1. Results are in Table III.

TABLE III

Effect of Mole Ratios of 1:1 to 5:1
Propionic Acid to Formaldehyde

| Run No. | Ratio Acid:Formaldehyde | % Conversion Acid |
|---|---|---|
| 5825-184 | 1:1 | 41.9 |
| 5886-165 | 2:1 | 23.0 |
| 6045-68 | 3:1 | 19.2 |
| 6045-86 | 4:1 | 15.0 |
| 6045-87 | 5:1 | 12.1 |

| Run No. | % Selectivity Alpha-Methacrylic Acid | Yield (a) | % Selectivity to 3-Pentanone |
|---|---|---|---|
| 5825-184 | 74.7 | 31.3 | 0.80 |
| 5886-165 | 80.0 | 18.4 | 5.14 |
| 6045-68 | 63.6 | 12.2 | 11.8 |
| 6045-86 | 69.3 | 10.4 | 23.7 |
| 6045-87 | 49.1 | 5.9 | 38.5 |

| Reaction Conditions: | |
|---|---|
| Temperature: | 385–390° C. |
| Contact Time: | 3–4 sec. |
| Catalyst Wt.: | 2.6 gms |
| Catalyst Vol.: | 4.7 ml |
| N₂ Carrier Rate: | 6.0 ml/min |

(a) Based on propionic acid

The above data indicate that the 1:1 and 2:1 ratios of propionic acid to formaldehyde result in the highest percent conversion of propionic acid to alpha-methacrylic acid with the lowest selectivities to 3-pentanone and with good selectivities to alpha-methacrylic acid.

EXAMPLE XIII

In the procedure of Examples VII to XI, syntheses of alpha-methacrylic acid from propionic acid and formaldehyde (as trioxane) were made using Catalyst D but using reaction temperatures of 350° C., 385° C., 425° C. and 490° C. Results are in Table IV.

TABLE IV

Effect of Temperature Upon Selectivity to Alpha-Methacrylic Acid

| Run No. | Reaction Temperature °C. | % Conversion of Acid |
|---|---|---|
| 6045-64 | 350 | 5.4(a) |
| 6045-65 | 385 | 19.2 |

TABLE IV-continued

Effect of Temperature Upon Selectivity to Alpha-Methacrylic Acid

| 6045-66 | 425 | 33.2 |
|---|---|---|
| 6045-67 | 490 | 53.8 |

| Run No. | % Selectivity to Alpha-Methacrylic Acid | % Selectivity to 3-Pentanone |
|---|---|---|
| 6045-64 | 46.3(a) | 24.3 |
| 6045-65 | 63.6 | 11.8 |
| 6045-66 | 46.3 | 10.2 |
| 6045-67 | 5.25 | 24.8 |

| Conditions: | |
|---|---|
| Contact Time: | 3.0–3.7 sec. |
| Mole Ratio-Acid:Formaldehyde: | 3:1 |
| Catalyst Wt.: | 2.6 gms |
| Catalyst Vol.: | 4.7 ml |
| $N_2$ Carrier Rate: | 6 ml/min |

Note:
(a) Below 10% conversion, selectivity is subject to experimental error of between 20 to 30% (absolute).

The above data indicate that acid conversion increases with high temperatures, but that selectivity to alpha-methacrylic acid decreases. Accordingly, the lower reaction temperatures are preferred.

EXAMPLE XIV

In the procedure of Examples VI to XI, syntheses of alpha-methacrylic acid from propionic acid and formaldehyde (as trioxane) were made using Catalyst D. Additions of water were made to the feed in percentages of 2, 4 and 8. Results are in Table V.

TABLE V

Effect of Water Upon Selectivity to Alpha-Methacrylic Acid

| Run No. | Wt. % Water in Feed | % Conversion of Acid |
|---|---|---|
| 1 | 0 | 23.5 |
| 2 | 2 | 23.4 |
| 3 | 4 | 22.4 |
| 4 | 8 | 18.4 |

| Run No. | % Selectivity to Alpha-Methacrylic Acid | % Selectivity to 3-Pentanone |
|---|---|---|
| 1 | 85.1 | 5.14 |
| 2 | 88.2 | 4.77 |
| 3 | 88.2 | 3.69 |
| 4 | 89.0 | 3.49 |

| Conditions: | |
|---|---|
| Temperature: | 390° C. |
| Mole Ratio-Acid:Formaldehyde: | 2:1 |
| Contact Times: | 2.8 to 3.2 sec. |
| Catalyst Wt.: | 2.6 gms |
| Catalyst Vol.: | 4.7 ml |
| $N_2$ Carrier Rate: | 6.0 ml/min |

The above data indicate that presence of water in the reaction of propionic acid with formaldehyde tends to deactivate the reaction when water content is about 8% or more by weight in the feed. Conversion of acid diminishes with water content above 4 (wt) %. Selectivity to 3-pentanone also diminishes with consequent lower consumption of acid.

EXAMPLE XV

In the procedure of Examples VI to XI, syntheses of alpha-methacrylic acid from propionic acid (PA) and formaldehyde (FA) (as trioxane) were made using a silica gel prepared from a high sodium content, amorphous silica colloidal (Ludox (Trademark) HS-40 colloidal silica, a product of E. I. du Pont de Nemours & Co., Inc.). The catalyst was prepared by gellation at pH 5.5, followed by drying at 120° C. for 16 hours, and crushing and sieving to 18/40 mesh (U.S. sieve). The resulting material was cooled to room temperature and divided into two portions. One portion was calcined for 12 hours at 1000° F. The other portion was washed once with cold distilled water and then calcined for 12 hours at 1000° F. The washing procedure reduced sodium content from 10,000 parts per million (ppm) in the unwashed catalyst to 1760 ppm in the washed catalyst.

A second silica gel catalyst was prepared in the same procedure using an ammonium-stabilized, low sodium content amorphous silica colloid (Ludox (Trademark) As-40 colloidal silica, a product of E. I. du Pont de Nemours & Co., Inc.). The silica colloidal was gelled at pH 5.5, dried at 120° C. for 16 hours, crushed and sieved to 18/40 (U.S. sieve), cooled and divided into two parts. One portion was calcined for 12 hours at 1000° F. The other portion was washed five times with hot (90° C.) distilled water, then calcined for 12 hours at 1000° F. The washing procedure reduced sodium content from 2290 ppm in the unwashed catalyst to 160 ppm in the washed catalyst.

The four catalyst samples were evaluated for catalyst activity. Sodium content of the catalysts affected catalyst yield and selectivity drastically. A sodium content of 10,000 ppm resulted in lower propionic acid (PA) selectivity and formaldehyde (FA) selectivity than with a sodium content of 1760 ppm. A sodium content of 160 ppm resulted in lower yield and selectivity than with a sodium content of 2290 ppm.

The reaction conditions for all tests were: temperature 390° C., syringe pump rate 0.0774 ml/min., contact time 3.2 sec.; molar feed rate: HS-40 catalysts, 2:1 propionic acid (PA) to formaldehyde (FA); AS-40 catalysts, 2:1 and 1.54:1 PA to FA.

The resulting data indicate that alkali content, as sodium, of from about 200 ppm to about 15,000 ppm is required for catalyst activity and selectivity. The ammonium-stabilized low sodium content amorphous silica colloid catalyst AS-40 demonstrated activity equivalent to the washed high sodium amorphous colloidal silica catalyst from which sodium had been removed. Preferred alkali content, as sodium, is from about 1000 ppm to about 9000 ppm. The data are in Table VI.

TABLE VI

Effect of Catalyst Sodium Content Upon Synthesis of Alpha-Methacrylic Acid

| | Characteristics | | | | Yield | Selectivity | |
|---|---|---|---|---|---|---|---|
| | | | Area | Pore | Based | Based on | |
| Catalyst | Al ppm | Na ppm | $m^2/g$ (a) | Å (b) | on PA % | PA % | FA % |
| HS-40 | 236 | 10,000 | 155 | 138 | 18 | 52 | 51** |
| HS-40-W | 257 | 1,760 | 175 | 130 | 20 | 71 | 82** |
| AS-40 | 400 | 2,100 | 110 | 200 | 20 | 86 | 82** |
| AS-40 | 227 | 2,290 | 125 | 198 | 24* | 77* | 78* |
| AS-40-W | 120 | 160 | 123 | 176 | 8 | 44 | 50** |

(a) BET surface area
(b) Avg. Pore Diameter
*Feed mole ratio of 1.54:1 PA to FA
**Feed mole ratio of 2.0:1.0 PA to FA
W: Indicates washed catalyst

EXAMPLE XVI

In the procedure of Examples VI to XI and Example XV, syntheses of alpha-methacrylic acid from propionic acid and formaldehyde (as trioxane) were made using a silica gel catalyst AS-40 prepared from a low sodium content, amorphous colloidal silica (Ludox (Trademark) AS-40 colloidal silica). Characteristics of the catalyst were: 400 ppm Al, 2100 ppm Na, 110 m$^2$/g area, 200 Å pore size.

The catalyst was evaluated in aging studies. Reaction conditions for all studies were the same: temperature 390° C., syringe pump rate 0.0774 ml/min., contact time 3.2 sec., mole feed rate 2:1 propionic acid (PA) to formaldehyde (FA); catalyst weight 2.60 g. Aging effects upon catalyst activity in preparation of alpha-methacrylic acid (MA) are shown in Table VII.

As shown in Table VII, yield of alpha-methacrylic acid increased over the period of the first 72 hours during the activation period then gradually decreased over the period of 72 to 144 hours. The catalyst was regenerated by heating from ambient temperature to 1000° F. over 12 hours, then calcining at 1000° F. for 12 hours, after which time product yield increased to 7.6 (wt) % from 4.2 (wt) %.

TABLE VII

| Aging Effects Upon Catalyst Activity | |
|---|---|
| Time-Hrs. | Yield of MA (Based on PA) % |
| Activation Period | |
| Up to 24 Hrs. | 17.8 |
| Up to 49 Hrs. | 21.1 |
| Up to 72 Hrs. | 21.8 |
| Deactivation Period | |
| 72 Hrs. to 95 Hrs. | 13.0 |
| 95 Hrs. to 120 Hrs. | 6.1 |
| 120 Hrs. to 144 Hrs. | 4.2 |
| Regeneration Period | |
| 144 Hrs. to 168 Hrs. | 7.6 |

EXAMPLE XVII

In the procedure of Example XVI, Catalyst AS-40W deactivation was evaluated wherein catalyst regeneration by calcining in the procedure of Example XVI was made for 24 hours at 1000° F. after each 72 hour reaction run at 390° C., using a 2:1 mole ratio of propionic acid (PA) to formaldehyde (FA) and 6 ml/min. N$_2$ carrier rate. Results are in Table VIII.

TABLE VIII

| Deactivation-Regeneration-Deactivation Cycles AS-40W Catalyst | |
|---|---|
| Hours On Stream | Yield-MA % |
| 24 | 18.8 |
| 48 | 18.1 |
| 72 | 17.0 |
| (Regeneration-24 Hrs.) | |
| 96 | 17.1 |
| 120 | 17.8 |
| 144 | 14.8 |
| (Regeneration-24 Hrs.) | |
| 168 | 12.6 |
| 192 | 14.1 |
| 216 | 13.5 |
| (Regeneration-24 Hrs.) | |
| 240 | 12.4 |
| 264 | 13.5 |
| 288 | 12.2 |
| (Regeneration-24 Hrs.) | |
| 312–456 (a) | 12.1–14.1 |

TABLE VIII-continued

| Deactivation-Regeneration-Deactivation Cycles AS-40W Catalyst | |
|---|---|
| Hours On Stream | Yield-MA % |
| 456–744 (a) | 14.1–13.1 |

(a) Regeneration every 72 hours

EXAMPLE XVIII

In the procedure of Examples XVI and XVII, aging studies were made of Catalyst AS-40W. Catalyst characteristics were: 400 ppm Al, 2100 ppm Na, 110 m$^2$/g area, 200 Å pore size. Reaction conditions were: temperature 390° C., syringe pump rate 0.0774 ml/min.; contact time 3.2 sec., mole feed rate 2:1 propionic acid (PA) to formaldehyde (FA), catalyst weight 2.60 g.

The liquid feed to the tubular reactor contained 100 ppm of sodium propionate. The catalyst was regenerated every 72 hours by heating the catalyst from room temperature to 528° C. over a period of 12 hours, then calcining at 528° C. for 12 hours. A control run was made wherein no sodium propionate was added to the feed. Results are in Table IX.

TABLE IX

| Activity of Silica Gel Catalyst With Added Sodium Ions In Feed | | |
|---|---|---|
| | Yield-MA % | |
| Days On Stream | Na$^+$ Added | No Na$^+$ Added |
| 1 | 21 | 20.0 |
| 4 | 20 | 19.0 |
| 7 | 19.8 | 13.8 |
| 10 | 19.2 | 12.1 |
| 12 | 18.4 | — |

EXAMPLE XIX

A 33.4 g sample of uncalcined but dried catalyst was prepared in the procedure of Example V. The resulting material was analyzed by A.A. spectroscopy and reported to contain 380 ppm sodium and 290 ppm aluminum. Trisodium phosphate dodecahydrate, 1.1 g, was then impregnated into the silica by the incipient wetness technique to cause the catalyst to contain about 2700 ppm phosphorus. The incipient wetness technique comprises adding the trisodium phosphate-water solution to the dried catalyst until visible wetness is discerned on the particle surface. This is also known as the pore filling technique. The material was then calcined at 528° C. for 12 hours, 12 hours being required to increase the temperature from ambient to 528° C. The resulting catalyst contained 2700 ppm phsphorus and 6000 ppm sodium.

The catalyst was evaluated in the procedure of Example XVII with two different trisodium phosphate replacement levels, 3.6 ppm P and 11 ppm P. The 3.6 ppm phosphorus and 11 ppm phosphorus feed components were dissolved as Na$_3$PO$_4$.12H$_2$O. Regeneration period was every two days (48 hrs. Process details were: catalyst 2700 ppm P (As Na$_3$PO$_4$) on As-40W; catalyst vol. 4.7 cc; reaction temp. 400° C, contact time 3 sec.; N$_2$ carrier 6 ml/min., air carrier 6 ml/min., feed 1:1 mole ratio PA:FA. Results are in Table X.

TABLE X

Effect of Phosphorus Ions In Feed Upon Catalyst Activity

| Days On Stream | Selectivity (a) % 3.6 ppm P | Selectivity (a) % 11 ppm P | Yield (a) % 3.6 ppm P | Yield (a) % 11 ppm P |
|---|---|---|---|---|
| 1 | 68 | 68 | 24.0 | 26.5 |
| 3 | 66 | 64 | 26.0 | 26.0 |
| 5 | 68 | 60 | 27.5 | 25.0 |
| 7 | 64.5 | 58 | 28.0 | 24.5 |
| 9 | 65 | 54 | 28.5 | 23.0 |

(a) Based on propionic acid (PA)

The above data indicate that at a lower replacement level of phosphorus, catalyst activity and selectivity were maintained at a higher level.

EXAMPLE XX

AS-40W catalysts, prepared in the procedure of Example V, were impregnated with other alkali metal phosphates to a level of 1350 ppm phosphorous according to the procedure of Example XIX to determine the activities at several reaction temperatures of other alkali species, i.e., potassium, rubidium and cesium phosphates, according to the procedure of Example XV. For these three, the yields of alpha-methacrylic acid differed less than 2% and potassium was about 2% greater than the yield obtained with sodium (Rb>Cs>K>Na). The propionic acid selectivities were within 5% of each other, and the selectivity obtained with sodium was about 3% greater than that obtained with potassium (Na>K>Rb>Cs). The above data indicate a consistent inverse dependency of propionic selectivity on basic strength of the catalytically-active alkali metal phosphate over the range of process temperatures. Process details were: catalyst volume 4.7 cc; contact time 3 sec.; $N_2$ carrier rate 6 ml/min.; feed 2:1 mole ratio PA:FA; LHSV 1 (vol.-based). Results as to yields are in Table XII.

TABLE XII

Yields Using Alkali Metal Phosphate AS-40W Catalysts

| | Reaction Temperature | | | | | |
|---|---|---|---|---|---|---|
| | 390° C. | | 400° C. | | 410° C. | |
| | % Y | % S | % Y | % S | % Y | % S |
| $Na_3PO_4$ | 19.2 | 75.7 | 21.1 | 71.0 | 21.9 | 72.1 |
| $K_3PO_4$ | 21.1 | 72.1 | 22.9 | 68.4 | 22.1 | 60.0 |
| $Rb_3PO_4$ | 21.3 | 70.9 | 24.5 | 66.8 | 23.4 | 57.4 |
| $Cs_3PO_4$ | 21.4 | 70.1 | 23.4 | 64.3 | 21.8 | 59.4 |

Note:
Y - Yield based on propionic acid
S - Selectivity based on propionic acid

EXAMPLE XXI

In the procedure of Examples VI to XI and Example XV, a synthesis of alpha-methacrylic acid from propionic acid and formaldehyde (as trioxane) was made using an alkaly metal phosphate AS-40 catalyst, prepared in the procedures of Examples V and XIX, containing 1350 ppm phosphorus. The alkali metal phosphate was $Cs_3PO_4$ which was selected because of its high activity.

The catalyst was evaluated in the presence of hydrocarbon diluent. Reaction conditions were: temperature 390° C., syringe pump rate 0.0774 ml/min., contact time 3.7 (approx.) sec., $N_2$ carrier gas flow rate 6.0 ml/min., LHSV 1 (vol. based), catalyst vol 4.7 cc.

A feed solution was prepared consisting of 10.0 ml (8.65 g) toluene, 2.8 g formaldehyde (as trioxane) and 1.0 ml (0.99 g) of propionic acid. A portion of the feed solution, 9.0 g, was passed through the reactor. The 9.0 g contained 6.25 g (0.068 mole) toluene, 2.04 g (0.068 mole) formaldehyde, and 0.72 g (0.0097 mole) propionic acid. The 1:7 ratio (0.0097 mole:0.068 mole), propionic acid: formaldehyde was equivalent to a ratio of 0.143:1. Gas chromatographic and titration analyses indicated conversion of propionic acid was essentially complete. Yield of alpha-methaacrylic acid based on propionic acid was 76%. Selectivity to alpha-methacrylic acid based on propionic acid was about 76%.

The above data demonstrate that in the presence of a diluent such as toluene, excess quantities of formaldehyde in feed cause additional conversion of propionic acid to alpha-methacrylic acid to very high levels, as much as 76%, based on propionic acid, in the presence of alkali metal impregnated AS-40 catalyst.

What is claimed is:

1. A process for preparation of alpha, beta-unsaturated acids by reaction at a temperature within the range from about 250° C. to 400° C. between formaldehyde and a carboxylic acid of formula $RCH_2COOH$ wherein R is selected from the class consisting of —H, -alkyl, -aryl, -aralkyl, and -cycloalkyl radicals in the presence of a catalyst composition comprising a Group IA alkali metla component and a silica component, wherein said Group IA alkaly metla component is present in an amount in the range from about 200 parts per million to about 15,000 parts per million by weight measured as sodium or sodium mol equivalents, and wherein said silica component is prepared by precipitating a colloidal silica from aqueous solution in the presence of hydrogen ions and thereupon dried, crushed, and calcined such that said silica component has a surface area of 50–500 $m^2/g$, a pore volume of 0.5–3.5 cc/g and average pore diameter of 80–600 Å, and contains between zero and about 500 parts per million by weight individually of aluminum, zirconium, titanium, or iron.

2. The process of claim 1 wherein said Group IA alkali metal component is present in a range of from about 1000 to about 9000 parts per million by weight.

3. The process of claim 1 wherein the said Group IA alkali metal component is selected from the group consisting of lithium, sodium, potassium, rubidium, cesium, and mixtures thereof.

4. The process of claim 1 wherein the said Group IA alkali metal component is present as a hydroxide, said Group IA alkali metal component is sodium and said sodium is present in a range of from about 1000 to about 3000 parts per million by weight.

5. The process of claim 1 wherein said Group IA alkali metal component is present as a tri-basic phosphate salt, said Group IA alkali metal component is sodium and said sodium is present in a range of from about 1000 to 9000 parts per million by weight.

6. The process of claim 1 wherein R of said formula $RCH_2COOH$ contains from 1 to 18 carbon atoms.

7. The process of claim 1 wherein said reactant acid is propionic acid.

8. The process of claim 1 wherein said reactant acid is acetic acid.

9. The process of claim 1 wherein the mole ratios of said reactant acid to formaldehyde are in the range of from about 0.1:1 to about 5:1.

10. The process of claim 9 wherein said mole ratio is from about 1:1 to about 2:1.

11. The process of claim 1 wherein water content of said formaldehyde and said reactant carboxylic acid is no greater than about 8% by weight.

12. The process of claim 1 wherein water content of said formaldehyde and said reactant carboxylic acid is no greater than about 4% by weight.

13. The process of claim 1 wherein said formaldehyde is selected from the group consisting of dry formaldehyde in gaseous state, paraformaldehyde, methanolic formaldehyde and trioxane.

14. The process of claim 1 wherein said formaldehyde comprises trioxane.

15. In a process for preparation of alpha, beta-unsaturated acids by reaction at a temperature within the range from about 250° C. to 400° C. between formaldehyde and a carboxylic acid of the formula $RCH_2COOH$ wherein R is selected from the class consisting of —H, —alkyl, —aryl, —aralkyl, and —cycloalkyl radicals in the presence of a catalyst composition comprising a Group IA alkali metal component and a silica component, wherein said Group IA alkali metal component is present in an amount in the range of from about 200 parts per million to about 15,000 parts per million by weight as sodium or sodium mol equivalent, and wherein said silica component contains from zero to about 500 parts per million by weight individually of aluminum, zirconium, titanium, or iron, and wherein said catalyst composition loses said alkali metal component with consequent decrease in catalyst activity, the improvement in which said activity of said catalyst composition is maintained during said process by addition of a Group IA alkali metal component to a feed to said process whereby the level of said alkali metal component on said catalyst is maintained.

16. The process of claim 15 wherein said alkali metal component of said catalyst composition is maintained at a level of from about 1000 to about 9000 parts per million by weight.

17. the process of claim 15 wherein said alkali metal component is selected from the group consisting of lithium, sodium, potassium, ribidum and cesium.

18. The process of claim 15 wherein said alkali metal component is sodium.

* * * * *

UNITED STATES PATENT OFFICE
CERTIFICATE OF CORRECTION

Patent No. 4,943,659                    Dated   July 24, 1990

Inventor(s) GARY P. HAGEN

It is certified that error appears in the above-identified patent and that said Letters Patent is hereby corrected as shown below:

Column  Line

Abstract  9  "$RHC_2COOH$" should read --$RCH_2COOH$--

8   52  "$NaAlO_2 \cdot 1\frac{1}{2}H_2O$" should read --$NaAlO_2 \cdot 1\frac{1}{2}H_2O$--
14  16  "As" should read --AS--
16  57  "phsphorus" should read --phosphorus--
16  63  "$Na_3PO_4 \cdot 12H_2O$" should read --$Na_3PO_4 \cdot 12H_2O$--
16  64  "(48 hrs." should read --(48 hrs.)--
16  65  "(As" should read --(as --
16  65  "As-40W" should read --AS-40W--
17  59  "alkaly" should read --alkali--
18  11  "methaacrylic" should read --methacrylic--
18  28  "metla" should read --metal--
20  19  "ribidum" should read --rubidium--

Signed and Sealed this

Thirty-first Day of December, 1991

Attest:

HARRY F. MANBECK, JR.

Attesting Officer                 Commissioner of Patents and Trademarks